UNITED STATES PATENT OFFICE.

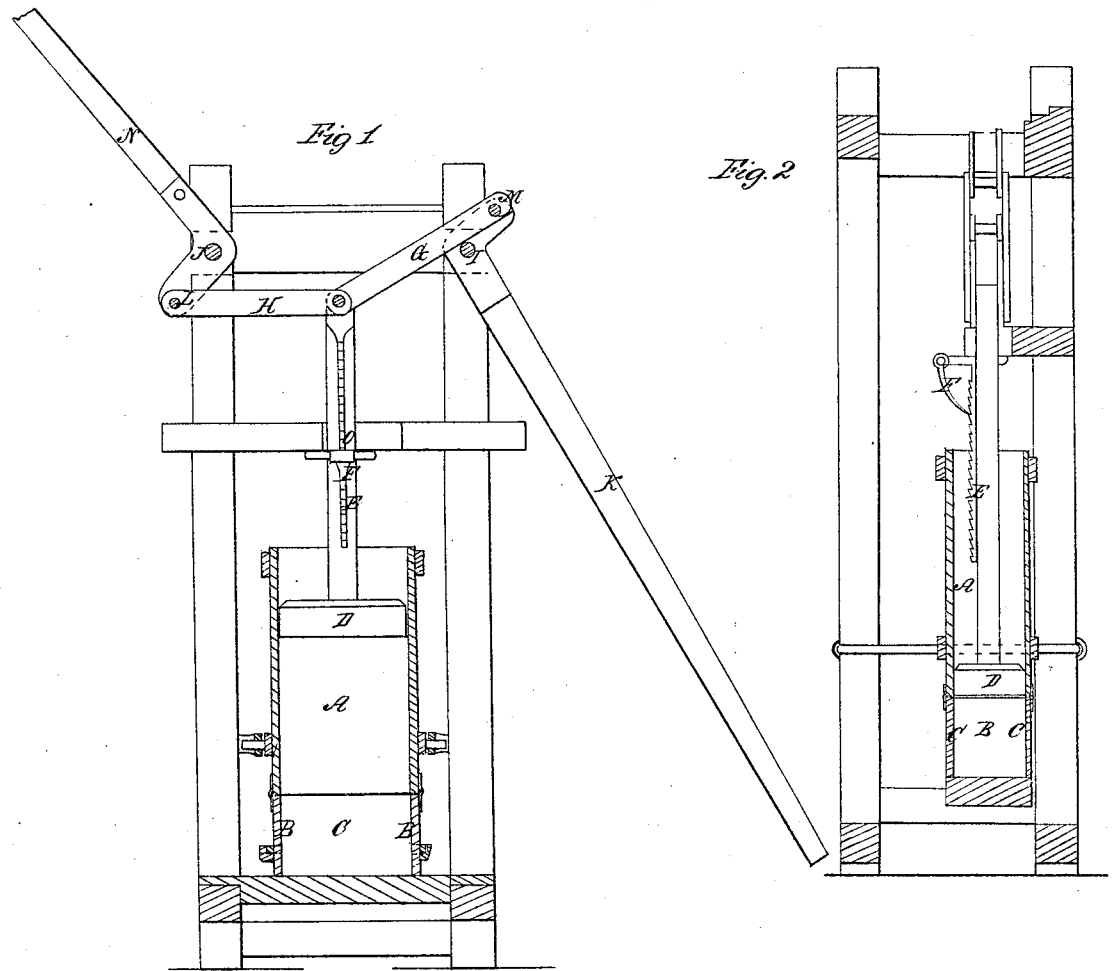

A. RODEN, OF TALLADEGA, ALABAMA.

IMPROVEMENT IN PRESSES.

Specification forming part of Letters Patent No. 29,719, dated August 21, 1860.

*To all whom it may concern:*

Be it known that I, A. RODEN, of the city and county of Talladega, and State of Alabama, have invented a new and useful Improvement in Presses; and I do hereby declare that the following is a full, clear, and exact description of the same, reference being had to the accompanying drawings, forming a part of this specification, in which—

Figures 1 and 2 represent vertical sections of the press.

Similar letters of reference in each of the figures indicate corresponding parts.

The nature of my invention consists in the arrangement of two levers and toggle-joints in combination with the follower of a press, in the manner and for the purposes hereinafter described.

To enable others skilled in the art to make and use my invention, I will proceed to describe its construction and operation.

The follower D of the press travels in a box, A, secured to the main frame of the machine. The lower part of the box consists of four hinged wings, B B C C, which can be opened after the bale has been pressed ready to be roped and removed. The follower-rod is provided with a rack, E, into whose teeth a pawl, F, pivoted to the main frame, can be inserted after the bale has been sufficiently compressed, so as to prevent the follower from yielding to the reaction of the compressed bale when the application of power to the pressing-lever ceases. The pressing-levers K N are each provided with a short arm, and are pivoted to the main frame at I J, respectively, in such a manner that the long arm of one lever points downward, and its short arm upward when the long arm of the other lever points upward, and the short arm of the latter downward. The outer ends of the short arms are connected to a pivot at the upper end of the follower-rod by means of toggle-joints G H. When the follower is up, as seen in Fig. 1, the lever K is raised, so as to cause the short arm to swing on fulcrum I and depress the follower accordingly by means of toggle-joint G. During this time, until the short arm of K has moved the toggle-joint G nearly the whole diameter of the circle which the pivot M of said arm describes, the other lever is operated so as merely to follow the follower-rod with just so much power as is necessary to counteract the lateral pressure which the toggle-joint exerts against the pivot of the follower-rod. By the time the short arm of K has nearly completed the motion above described, the long arm of lever N stands nearly horizontal, and by moving it a little farther toward the horizontal line an additional and final pressure can be imparted to the bale by means of toggle-joint H. The two levers will thus compensate each other during the operation of the machine, and by employing the one lever as a guide, so as to counteract the lateral pressure of the other lever, no friction-rollers or similar devices for guiding the follower-rod during its descent are required.

What I claim as my invention, and desire to secure by Letters Patent, is—

The arrangement of two levers, K N, and joggle-joints G H, in combination with the follower of a press, substantially as and for the purposes set forth.

The above specification of my improvement in presses signed by me this 7th day of July, 1860.

A. RODEN.

Witnesses:
N. D. MOSTELLER,
WM. WRIGHT.